United States Patent
He et al.

(10) Patent No.: US 11,265,909 B2
(45) Date of Patent: Mar. 1, 2022

(54) SMALL DATA TRANSFER OVER CONFIGURED GRANTS FOR ASYNCHRONOUS NON-ORTHOGONAL MULTIPLE ACCESS

(71) Applicant: QUALCOMM Incorporated, San Diego, CA (US)

(72) Inventors: Linhai He, San Diego, CA (US); Jing Lei, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/701,887

(22) Filed: Dec. 3, 2019

(65) Prior Publication Data

US 2020/0196349 A1 Jun. 18, 2020

Related U.S. Application Data

(60) Provisional application No. 62/780,295, filed on Dec. 16, 2018.

(51) Int. Cl.
*H04W 72/14* (2009.01)
*H04W 72/12* (2009.01)
*H04W 76/10* (2018.01)
*H04W 48/10* (2009.01)
*H04W 76/30* (2018.01)
*H04W 52/02* (2009.01)

(52) U.S. Cl.
CPC ....... *H04W 72/14* (2013.01); *H04W 72/1257* (2013.01); *H04W 72/1268* (2013.01); *H04W 76/10* (2018.02); *H04W 48/10* (2013.01); *H04W 52/0209* (2013.01); *H04W 76/30* (2018.02)

(58) Field of Classification Search
None
See application file for complete search history.

(56) References Cited

U.S. PATENT DOCUMENTS

| | | | |
|---|---|---|---|
| 2017/0118701 A1* | 4/2017 | Kim | H04W 48/20 |
| 2018/0152907 A1 | 5/2018 | Zhang et al. | |
| 2018/0309553 A1* | 10/2018 | Cao | H04W 72/046 |
| 2019/0045489 A1* | 2/2019 | He | H04W 72/12 |

(Continued)

OTHER PUBLICATIONS

International Search Report and Written Opinion—PCT/US2019/064384—ISA/EPO—dated Mar. 13, 2020.

(Continued)

*Primary Examiner* — Jutai Kao
(74) *Attorney, Agent, or Firm* — Patterson & Sheridan, LLP

(57) ABSTRACT

Certain aspects of the present disclosure provide techniques and apparatus for dynamic switching between non-codebook based and codebook based uplink transmission schemes. An exemplary method that may be performed by a user equipment (UE) generally includes obtaining, from a base station (BS), parameters and a grant of transmission resources for asynchronous non-orthogonal multiple access (A-NOMA) transmissions; obtaining data for transmission to the BS; and transmitting the data in an A-NOMA transmission via the transmission resources according to the parameters while the UE is in a radio resource control (RRC) Inactive mode.

30 Claims, 10 Drawing Sheets

(56) References Cited

U.S. PATENT DOCUMENTS

2019/0380154 A1* 12/2019 Wei ................. H04W 76/27
2020/0037210 A1* 1/2020 Rugeland .......... H04W 36/0033

OTHER PUBLICATIONS

KDDI: "Discussion on Procedures Related to NOMA", 3GPP Draft, 3GPP TSG RAN WG1 Meeting #94bis, R1-1811486, 3rd Generation Partnership Project (3GPP), Mobile Competence Centre, 650, Route Des Lucioles, F-06921 Sophia-Anti Polls Cedex, France, vol. RAN WG1, No. Chengdu, China, Oct. 8, 2018-Oct. 12, 2018, Sep. 28, 2018 (Sep. 28, 2018), XP051518889, pp. 1-5, Retrieved from the Internet: URL: http://www.3gpp.org/ftp/tsg%5Fran/WG1%5FRL1/TSGR1%5F94b/Docs/R1%2D1811486%2Ezip, [retrieved on Sep. 28, 2018], Figure 1, Table 1, Paragraph [0001], Paragraph [02.1].

Qualcomm Incorporated: "Procedures Related to NOMA", 3GPP Draft, 3GPP TSG RAN WG1 Meeting #95, R1-1813407, Procedures Related to NOMA, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051555446, pp. 1-9, Retrieved from the Internet: URL: http://www.3gpp.org/ftp/Meetings%5F3GPP%5FSYNC/RAN1/Docs/R1%2D1813407%2Ezip, [retrieved on Nov. 11, 2018], Paragraph [0005]—Paragraph [0006], Paragraph [0001], Paragraph [02.2], Paragraph [0005], Paragraph [0004].

Qualcomm Incorporated: "Transmitter Side Signal Processing Schemes for NOMA", 3GPP Draft, 3GPP TSG RAN WG1 Meeting #95, R1-1813405 Transmitter Side Signal Processing Schemes for NOMA, 3rd Generation Partnership Project (3GPP), Mobile Competence Centre, 650, Route Des Lucioles, F-06921 Sophia-Antipolis CEO, vol. RAN WG1, No. Spokane, USA, Nov. 12, 2018-Nov. 16, 2018, Nov. 11, 2018 (Nov. 11, 2018), XP051555444, 14 Pages, Retrieved from the Internet: URL: http://www.3gpp.org/ftp/TSG_RAN/WG1_RL1/TSGR1_95/Docs/R1-1813405.zip [retrieved on Nov. 11, 2018], Sections 2 and 3.

* cited by examiner

SMALL DATA TRANSFER OVER CONFIGURED GRANTS FOR ASYNCHRONOUS NON-ORTHOGONAL MULTIPLE ACCESS

CROSS-REFERENCE TO RELATED APPLICATIONS

The present application for patent claims benefit of and priority to U.S. Provisional Patent Application Ser. No. 62/780,295, filed Dec. 16, 2018, which is assigned to the assignee hereof and hereby expressly incorporated by reference herein in its entirety as if fully set forth below and for all applicable purposes.

BACKGROUND

Field of the Disclosure

Aspects of the present disclosure relate generally to wireless communications systems, and more particularly, to techniques for transferring small amounts of data via asynchronous non-orthogonal multiple access (A-NOMA) transmissions on configured grants.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications that may be performed, for example, by a user equipment (UE). The method generally includes obtaining, from a base station (BS), parameters and a grant of transmission resources for asynchronous non-orthogonal multiple access (A-NOMA) transmissions; obtaining data for transmission to the BS; and transmitting the data in an A-NOMA transmission via the transmission resources according to the parameters while the UE is in a radio resource control (RRC) Inactive mode.

Certain aspects of the present disclosure provide a method for wireless communications that may be performed, for example, by a base station (BS). The method generally includes transmitting parameters and a grant of transmission resources for asynchronous non-orthogonal multiple access (A-NOMA) transmissions to the BS; and receiving data in an A-NOMA transmission via the transmission resources according to the parameters from a user equipment (UE) that is in a radio resource control (RRC) Inactive mode.

Certain aspects of the present disclosure provide an apparatus for wireless communications. The apparatus generally includes a processor configured to: obtain, from a base station (BS), parameters and a grant of transmission resources for asynchronous non-orthogonal multiple access (A-NOMA) transmissions; obtain data for transmission to the BS; and transmit the data in an A-NOMA transmission via the transmission resources according to the parameters while the apparatus is in a radio resource control (RRC) Inactive mode; and a memory coupled with the processor.

Certain aspects of the present disclosure provide an apparatus for wireless communications. The apparatus generally includes a processor configured to: transmit parameters and a grant of transmission resources for asynchronous non-orthogonal multiple access (A-NOMA) transmissions to the apparatus; and receive data in an A-NOMA transmission via the transmission resources according to the parameters from a user equipment (UE) that is in a radio resource control (RRC) Inactive mode.

Certain aspects of the present disclosure provide an apparatus for wireless communications. The apparatus generally includes means for obtaining, from a base station (BS), parameters and a grant of transmission resources for asynchronous non-orthogonal multiple access (A-NOMA) transmissions; means for obtaining data for transmission to the BS; and means for transmitting the data in an A-NOMA transmission via the transmission resources according to the parameters while the apparatus is in a radio resource control (RRC) Inactive mode.

Certain aspects of the present disclosure provide an apparatus for wireless communications. The apparatus generally includes means for transmitting parameters and a grant of transmission resources for asynchronous non-orthogonal multiple access (A-NOMA) transmissions to the apparatus; and means for receiving data in an A-NOMA transmission via the transmission resources according to the parameters from a user equipment (UE) that is in a radio resource control (RRC) Inactive mode.

Certain aspects of the present disclosure provide a computer-readable for wireless communications. The computer-readable medium includes instructions that, when executed by a processing system, cause the processing system to perform operations generally including obtaining, from a base station (BS), parameters and a grant of transmission resources for asynchronous non-orthogonal multiple access (A-NOMA) transmissions; obtaining data for transmission to the BS; and transmitting the data in an A-NOMA transmission via the transmission resources according to the parameters while an apparatus including the processing system is in a radio resource control (RRC) Inactive mode.

Certain aspects of the present disclosure provide a computer-readable for wireless communications. The computer-readable medium includes instructions that, when executed by a processing system, cause the processing system to perform operations generally including transmitting parameters and a grant of transmission resources for asynchronous non-orthogonal multiple access (A-NOMA) transmissions to an apparatus including the processing system; and receiving data in an A-NOMA transmission via the transmission resources according to the parameters from a user equipment (UE) that is in a radio resource control (RRC) Inactive mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
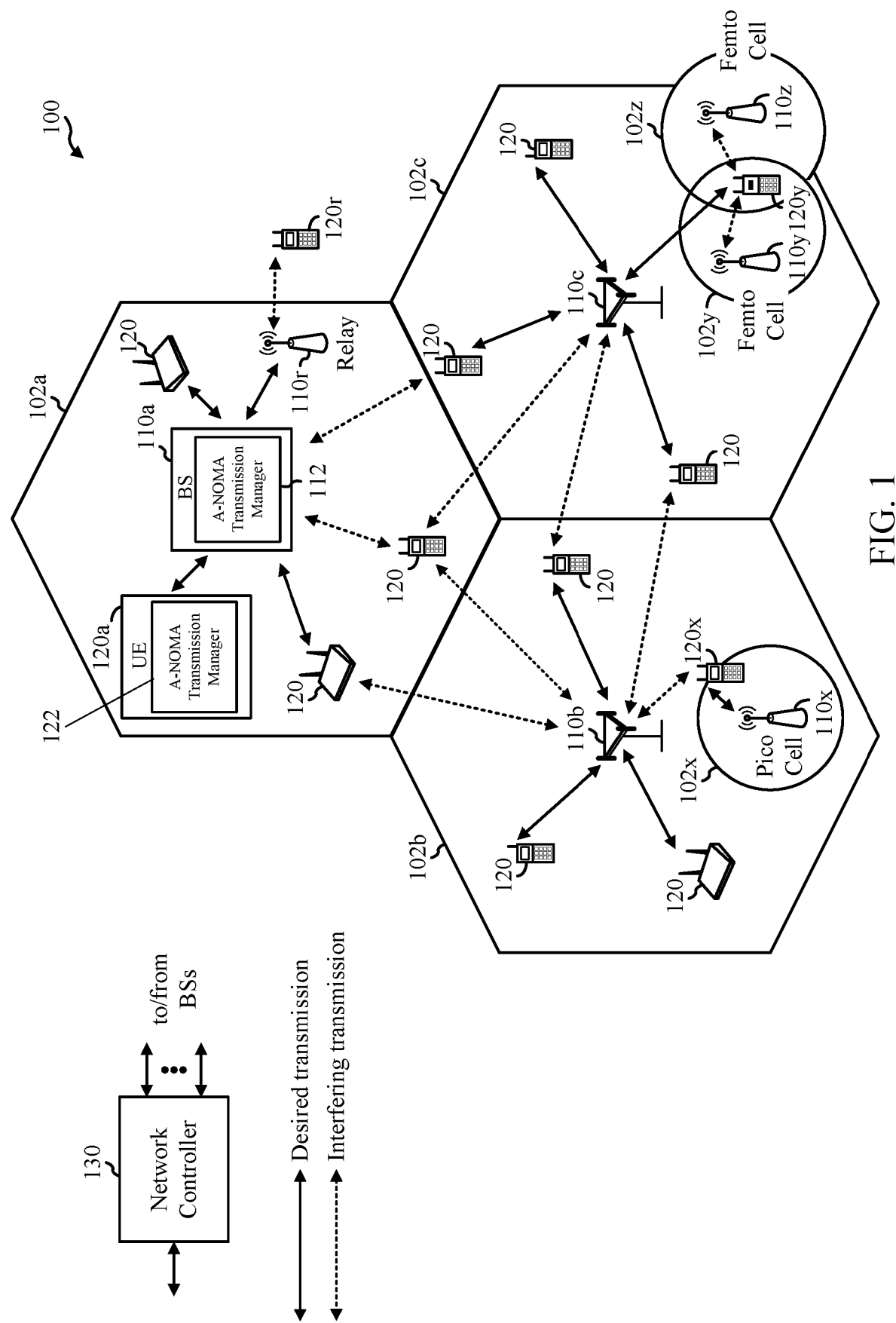
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g., 80 MHz and wider), millimeter wave (mmW) targeting high carrier frequency (e.g., 27 GHz and higher), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

According to aspects of the present disclosure, a UE may use transmission resources provided in one or more grants provided for asynchronous non-orthogonal multiple access (A-NOMA) transmission for making an A-NOMA transmission to complete a small data transfer (SDT) to a BS while the UE remains in RRC Inactive mode.

In aspects of the present disclosure, a BS may transmit parameters and grants providing transmission resources for A-NOMA transmissions in a cell and receive an A-NOMA transmission from a UE via the granted transmission resources and according to the parameters while the UE remains in RRC Inactive mode.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. BS 110 may receive an uplink (UL) signal from UE 120 according to a first UL transmission configuration and determine whether to switch from the first UL transmission configuration to a second UL transmission configuration based on the received UL signal. BS 110 may transmit an indication of whether to switch from the first UL transmission configuration to the second UL transmission configuration to UE 120 to facilitate dynamic switching between non-codebook and codebook based UL transmissions as further described herein with respect to FIGS. 8 and 9.

As illustrated in FIG. 1, the wireless network 100 may include a number of base stations (BSs) 110a-z (each also individually referred to herein as BS 110 or collectively as BSs 110) and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

According to certain aspects, the BSs 110 may be configured for asynchronous non-orthogonal multiple access (A-NOMA) transmissions. As shown in FIG. 1, the BS 110a includes an A-NOMA transmission manager 112. The A-NOMA transmission manager 112 may be configured to transmit parameters and a grant of transmission resources for asynchronous non-orthogonal multiple access (A-NOMA) transmissions to the BS; and to receive data in an A-NOMA transmission via the transmission resources according to the parameters from a user equipment (UE) that is in a radio resource control (RRC) Inactive mode, in accordance with aspects of the present disclosure.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

According to certain aspects, the UEs 120 may be configured for asynchronous non-orthogonal multiple access (A-NOMA) transmissions. As shown in FIG. 1, the UE 120a includes am A-NOMA transmission manager 122. The A-NOMA transmission manager 122 may be configured to obtain, from a base station (BS), parameters and a grant of transmission resources for asynchronous non-orthogonal multiple access (A-NOMA) transmissions; to obtain data for transmission to the BS; and to transmit the data in an A-NOMA transmission via the transmission resources according to the parameters while the UE is in a radio resource control (RRC) Inactive mode, in accordance with aspects of the present disclosure.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., a gNB, a 5G NB, a NB, a TRP, or an AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
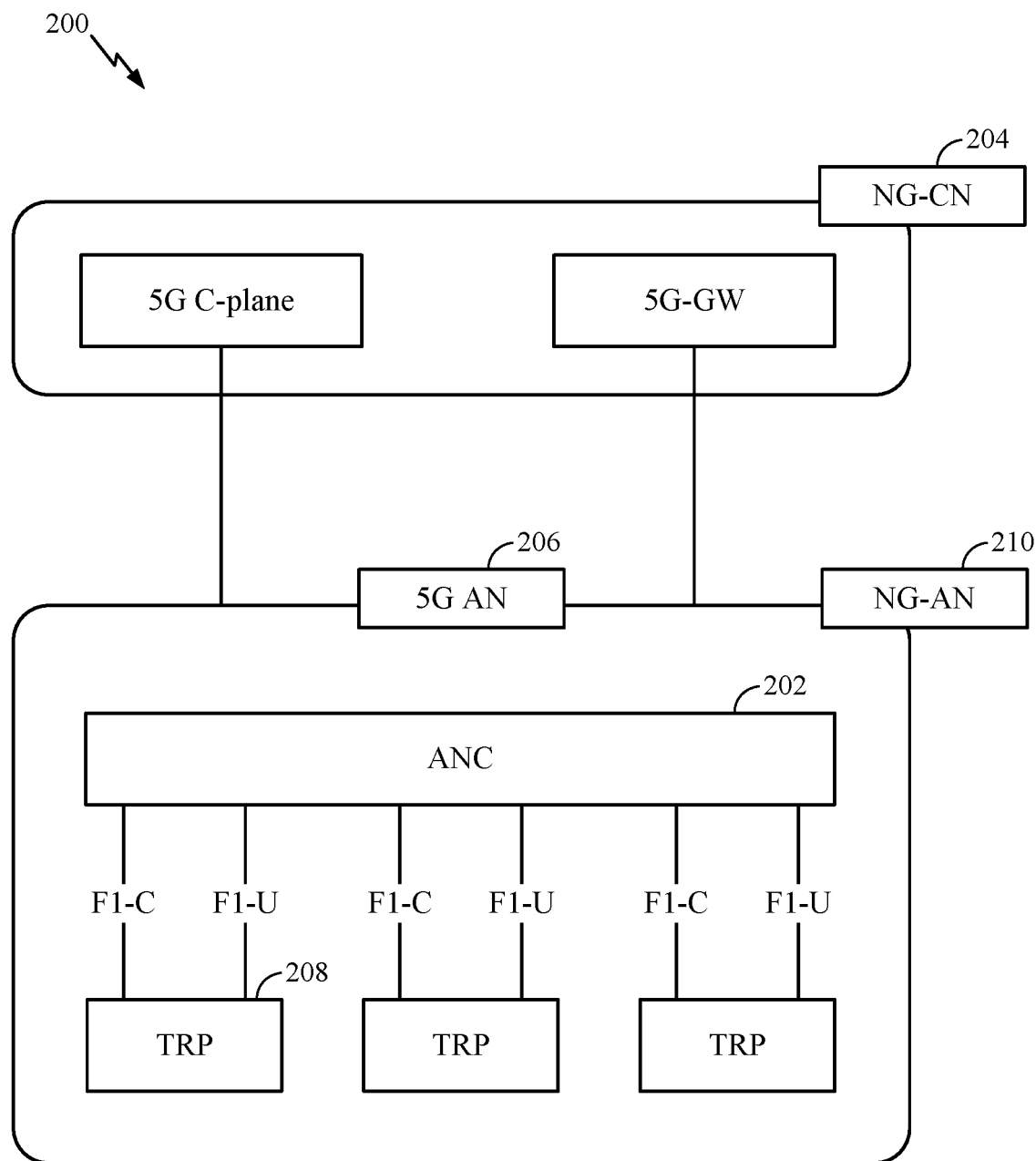
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
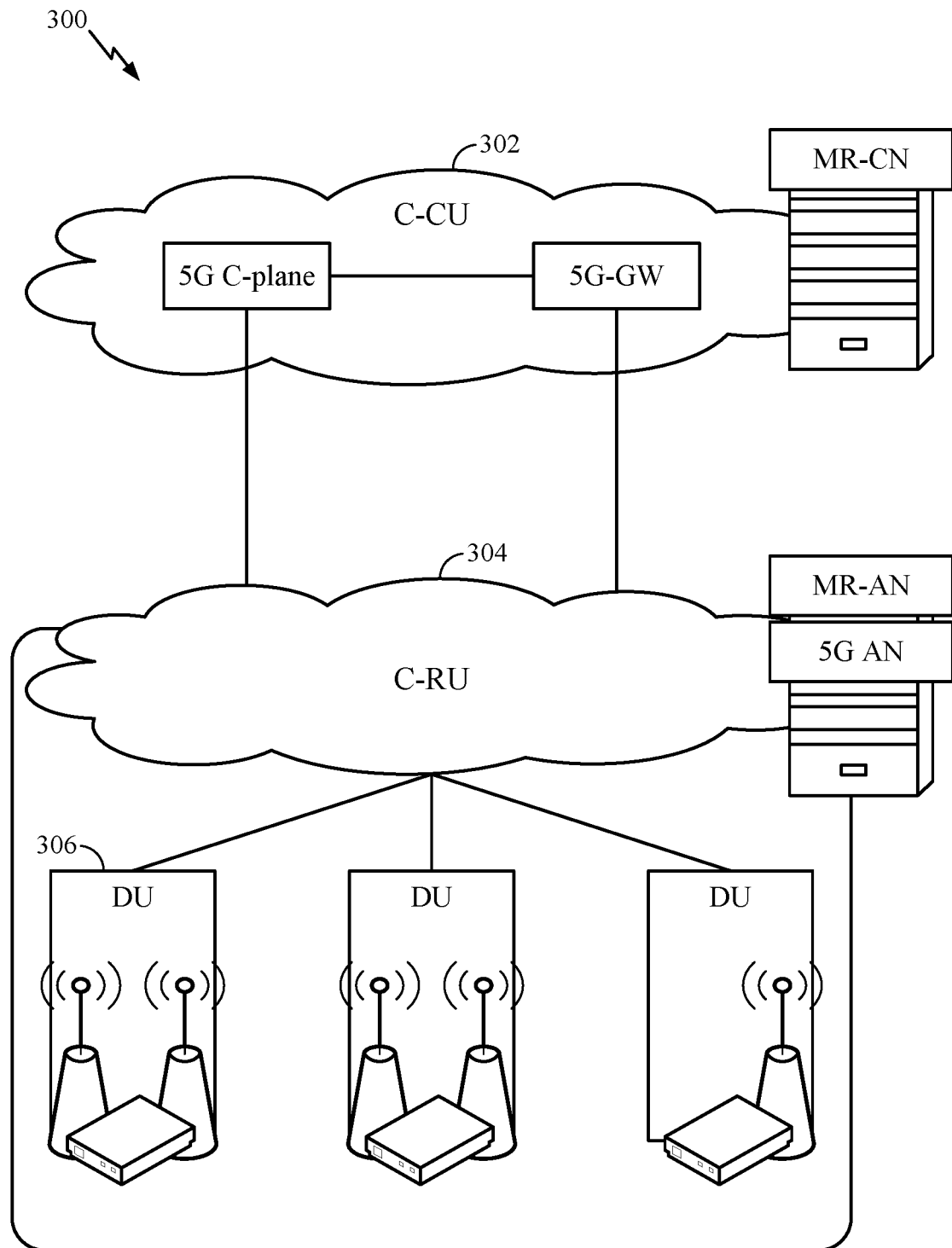
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
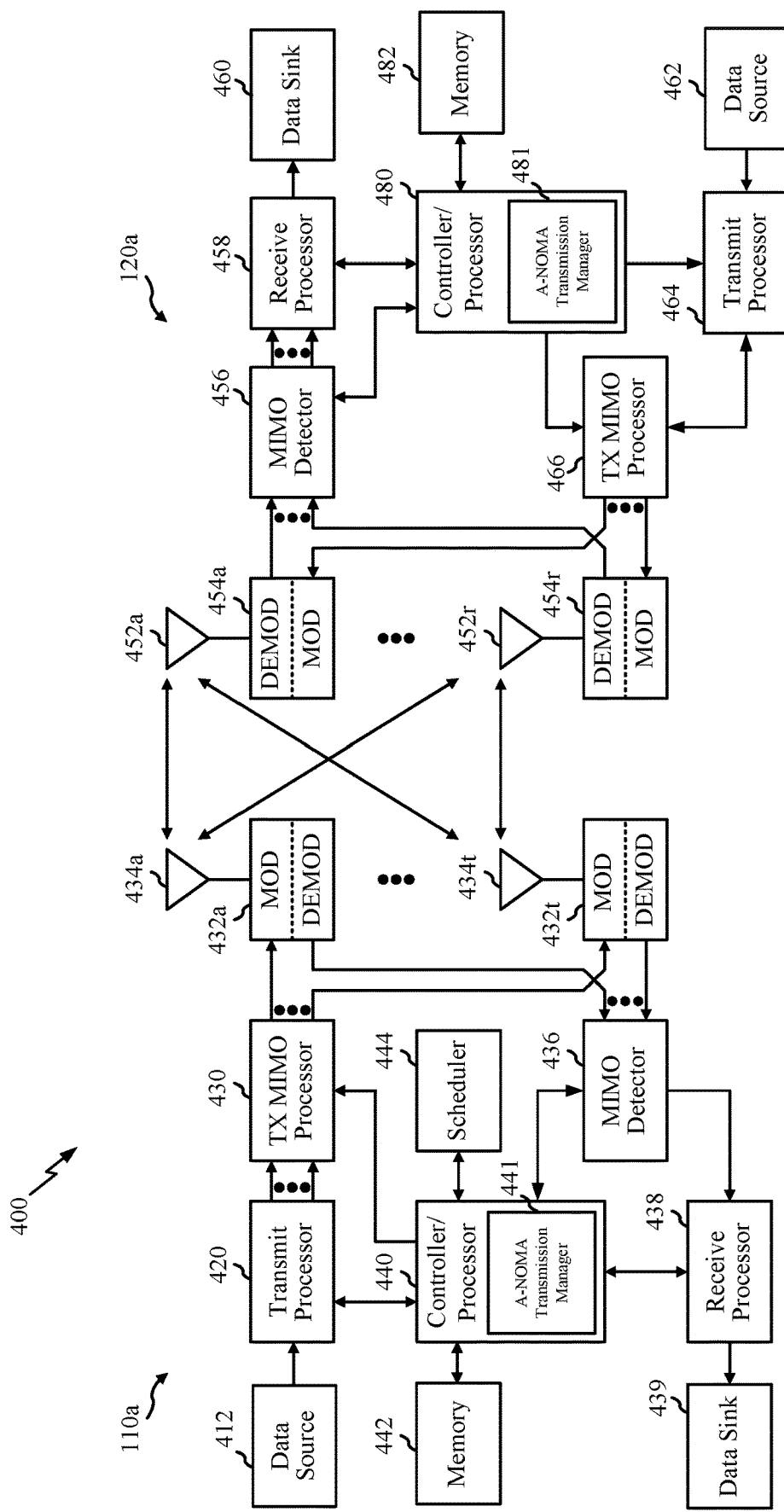
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. For example, as shown in FIG. 4, the controller/processor 440 of the BS 110a has an A-NOMA transmission manager 441 that may be configured for transmitting parameters and a grant of transmission resources for asynchronous non-orthogonal multiple access (A-NOMA) transmissions to the BS; and receiving data in an A-NOMA transmission via the transmission resources according to the parameters from a user equipment (UE) that is in a radio resource control (RRC) Inactive mode, according to aspects described herein. As shown in FIG. 4, the controller/processor 480 of the UE 120a has an A-NOMA transmission manager 481 that may be configured for obtaining, from a base station (BS), parameters and a grant of transmission resources for asynchronous non-orthogonal multiple access (A-NOMA) transmissions; obtaining data for transmission to the BS; and transmitting the data in an A-NOMA transmission via the transmission resources according to the parameters while the UE is in a radio resource control (RRC) Inactive mode, according to aspects described herein. Although shown at the Controller/Processor, other components of the UE 120a and BS 110a may be used performing the operations described herein. The memories 442 and 482 may store data and program codes for the BS 110 and the UE 120, respectively. A scheduler 444 may schedule UEs for data transmission on the downlink and/or uplink.

Figure 5:
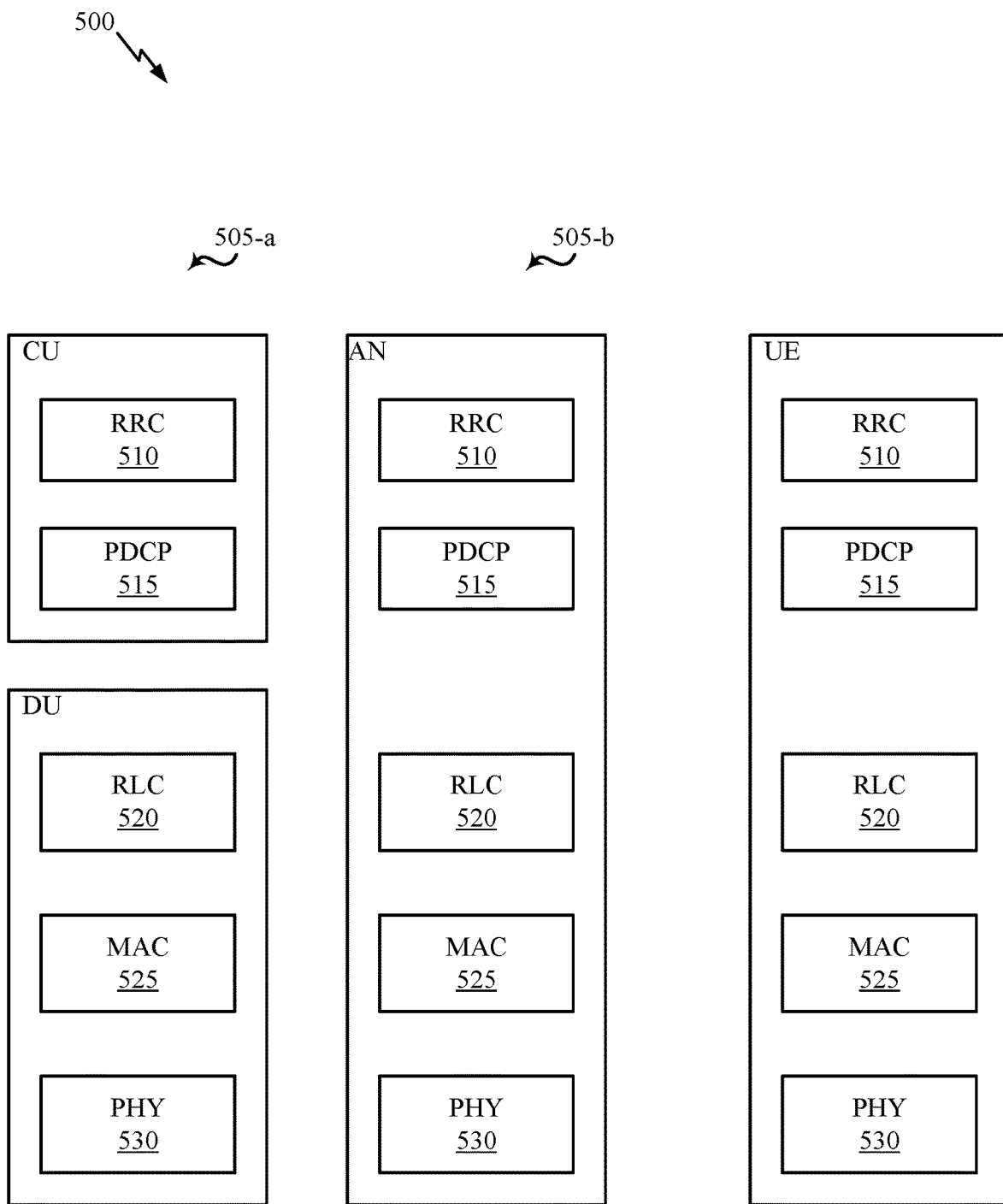
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
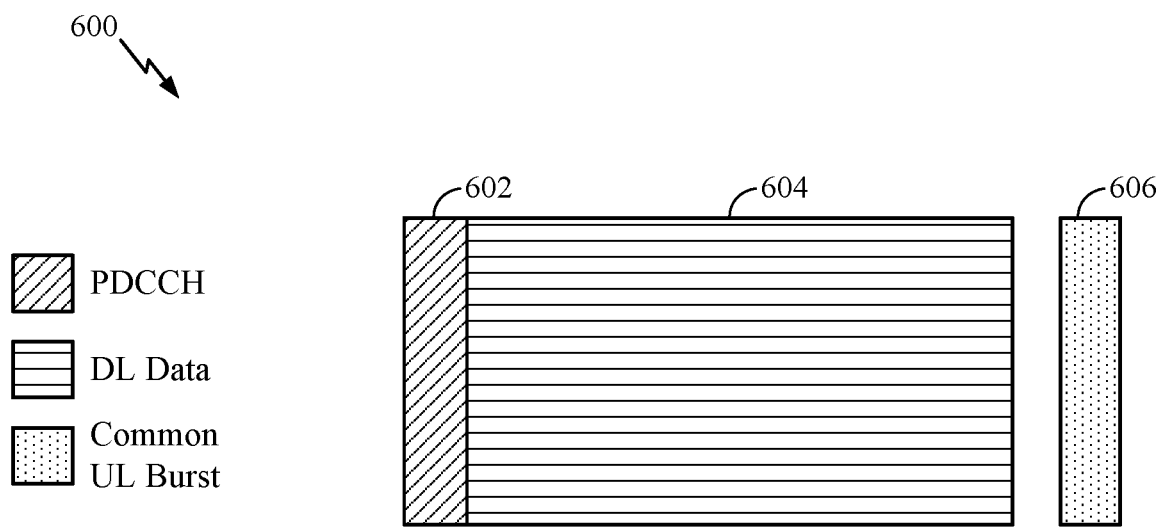
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
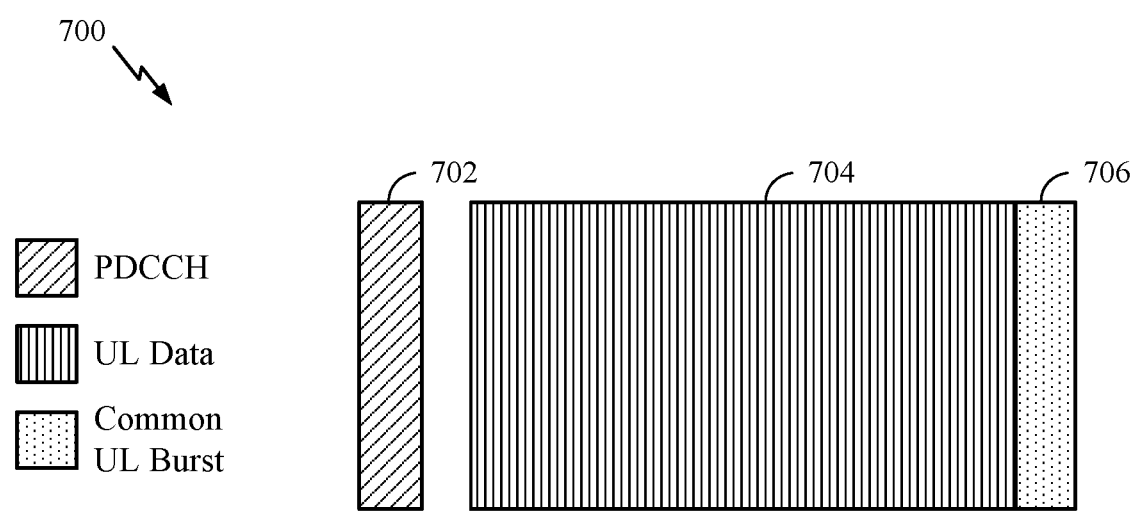
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In wireless communications, channel state information (CSI) may refer to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

In certain systems (e.g., LTE), CSI feedback is based on a pre-defined codebook. This may be referred to as implicit CSI feedback. Precoding may be used for beamforming in multi-antenna systems. Codebook based precoding uses a common codebook at the transmitter and receiver. The codebook includes a set of vectors and matrices. The UE calculates a precoder targeting maximum single-user (SU) multiple input multiple output (MIMO) spectrum efficiency. The implicit CSI feedback may include a rank indicator (RI), a transmitted precoding matrix indicator (TPMI), and associated channel quality indicator (CQI) based on the TPMI. The PMI includes a W1 precoding matrix and a W2 precoding matrix.

In certain systems (e.g., such as LTE), UL MIMO is generally achieved with precoder feedback, and thus is based on an uplink (UL) codebook based design. However, compared to LTE, certain systems (e.g., NR-MIMO) may support a non-codebook based UL transmission as one type of UL transmission scheme. Supporting a non-codebook based UL transmission scheme may refer to supporting an uplink transmission (e.g., from the UE) without including precoding information, such as a transmitted precoding matrix indicator (TPMI), in the UL grant.

In a non-codebook based UL transmission scheme, the UE may be configured with multiple SRS resources (e.g., for sending SRS), and each SRS resource may include one or more SRS ports. The UE may determine a candidate set of uplink transmit beams (e.g., precoders) based on measurement of downlink reference signals from the BS and channel reciprocity. The UE may use the determined uplink precoder to precode the SRS ports in each SRS resource and transmit the SRS resources to the BS. Upon receiving the SRS resources, the BS can measure the multiple precoded SRS ports, and choose a precoder for the UE to use for PUSCH. The BS can then feedback indicators along with downlink control information (DCI) (e.g., without TPMI) to indicate the rank and selected precoder for PUSCH.

Example Small Data Transfer Over Configured Grants for Asynchronous Non-Orthogonal Multiple Access According to aspects of the present disclosure, a UE may use transmission resources provided in one or more grants provided for asynchronous non-orthogonal multiple access (A-NOMA) transmission for making an A-NOMA transmission to complete a small data transfer (SDT) to a BS while the UE remains in RRC Inactive mode.

In aspects of the present disclosure, a BS may transmit parameters and grants providing transmission resources for A-NOMA transmissions in a cell and receive an A-NOMA transmission from a UE via the granted transmission resources and according to the parameters while the UE remains in RRC Inactive mode.

In previously known techniques, a UE executing some applications or in some scenarios (e.g., a smart watch or background synchronization of applications on a smart phone) generates only a small amount of data per transaction. It may be power inefficient for a UE to transition from a radio resource control (RRC) Idle mode (e.g., RRC Inactive mode) to an RRC Connected mode just to receive or send a small amount of data (e.g., 1000 bits or less), because this transition will require a high amount of overhead (e.g., RRC establishment or reconfiguration) in terms of time and power expended by the UE. It may be more power efficient for the UE to remain in RRC Inactive mode to send the data, using the limited context the UE has with the network.

Previously known techniques for sending a small amount of data when the UE is in an RRC Idle mode are based on the UE performing a random access procedure. In these techniques, if the amount of data is very small, then the UE starts a random access procedure and then sends the data in message 3 (msg3) of the random access procedure. If the amount of data is not very small (but still small), then the UE indicates to the network in msg3 of the random access procedure the amount of data the UE has to send (e.g., in a buffer status report (BSR) medium access control (MAC) control element (CE)) and the preference of the UE to stay in RRC Inactive mode to transfer the data. After the random access procedure by the UE is complete, the network provides one or more grants to the UE to enable the UE to complete the data transfer. These grants can be either dynamic UL grants or a sequence of pre-allocated grants. However, the random access procedure involves a considerable amount of overhead in time and power consumed when compared to the actual time and power spent by the UE for the data transfer.

The previously known technique of non-orthogonal multiple access (NOMA) allows multiple UEs to transmit to the network over the same radio (e.g., time and frequency) resources at the same time. Asynchronous NOMA (A-NOMA) is a previously known technique in which a UE is not required to acquire UL time synchronization with the network before the UE can transmit uplink data. This enables the UE to transmit data immediately, without the UE performing a random access channel (RACH) procedure to obtain UL synchronization.

When a UE performs a NOMA transmission, the UE transmits a contention-based transmission over a configured grant (CG). The network pre-allocates resources (i.e., configures grants) that are shared by a group of UEs. The network relies on layer one (L1) signaling (e.g., a demodulation reference signal (DMRS) included in the NOMA transmission by the UE) and/or a cell radio network temporary identifier (C-RNTI) used by a transmitting UE to identify each transmitting UE when the UEs transmit simultaneously over the same resources. Such an UL transmission still requires the UE to have UL synchronization. Having UL synchronization requires the UE to perform a RACH procedure before the UE can use the configured grant while the UE is in RRC Inactive mode, which defeats the purpose of using the configured grant for the small data transfer.

According to aspects of the present disclosure, sending an A-NOMA transmission does not require a UE to have UL synchronization. Sending data via an A-NOMA transmission may be less efficient than sending the data via a NOMA transmission in terms of transmission throughput, but may be good enough for a small data transfer (SDT) by a UE in RRC Inactive mode.

A significant challenge for use of A-NOMA transmissions is how a UE obtains the transmission parameters for use of an A-NOMA configured grant. Some of the parameters are common to all UEs in a cell. These common parameters include modulation and coding scheme (MCS), transport block (TB) size, transform precoder, resource allocation (time and frequency resources for the CG), resource block group (RBG) size (RBG-size), type of power control loop, and whether explicit acknowledgment (ACK) is used for the A-NOMA transmissions.

Other parameters, such as number of hybrid automatic retransmission request (HARD) processes, whether repetition is configured and the periodicity of the repetition, and length of a configured grant timer are UE-specific for regular (i.e., not A-NOMA) CGs, but to simplify configuration for A-NOMA in RRC Inactive mode, these parameters may be made common for all UEs making A-NOMA transmissions in a cell.

Still other parameters should be UE-specific, because different UEs using different values helps reduce contention. These other parameters may include bit/symbol scrambling sequence, DMRS/preamble configuration, frequency hopping pattern, time domain offset, spreading sequence(s) and permutation pattern(s) of the spreading sequences, and bit/symbol interleaving pattern. All of these parameters may be cell specific, and different cells may have different configuration parameters.

As mentioned above, acquisition of the UE-specific parameters is a significant challenge, but, according to aspects of the present disclosure, is less of an issue for UEs that are not very mobile. In addition, acquisition of the UE-specific parameters is relatively easy for the mobile terminated (MT) case (i.e., the case where the network initiates the small data transfer, such as when a timer in the network triggers the network to contact the UE), because the network (NW) may provide all of the parameters to the UE in a paging message the network sends when the network pages the UE.

According to aspects of the present disclosure, the network may provide UE-specific A-NOMA parameters to a UE in a release configuration (Release-Config) message when the network orders the UE to enter the RRC Inactive mode. In a Release-Config message, the network may provide parameters for a list of cells in the radio network notification area (RNA). This can be useful for UEs with no or limited mobility, as such a UE may receive the parameters when the UE receives the release configuration message, and the parameters will typically be useful when the UE next needs to send data, because the UE is most likely in the same cell or a neighboring cell, due to the limited mobility of the UE.

In aspects of the present disclosure, the network may broadcast A-NOMA parameters in system information (SI), i.e., in a system information broadcast (SIB). For the UE-specific parameters (e.g., DMRS), the network may transmit (e.g., in a broadcast) a range for each of the parameters. Each UE may then randomly select its own value for each parameter from the ranges, based on some hashing function while using an identifier (ID) of the UE (e.g., C-RNTI or Resume-ID or part of these IDs) as the key for the hashing function.

According to aspects of the present disclosure, a UE may obtain a UE-specific multiple access (MA) signature and map that MA signature to a range of a parameter (e.g., one or more of the UE-specific A-NOMA parameters mentioned above) received from the network to determine a UE-specific parameter for that UE.

In aspects of the present disclosure, a UE may obtain a pool of MA signatures that may be represented by math functions or look-up tables, which are broadcast in SI.

In aspects of the present disclosure, a BS may transmit (e.g., in a SIB) a pool of MA signatures that may be represented by math functions or look-up tables.

According to aspects of the present disclosure, a UE may randomly select a particular MA signature from the pool of signatures after decoding the SI.

In aspects of the present disclosure, a UE select a particular MA signature from the pool of signatures based on a globally unique identifier (GUID) of the UE.

According to aspects of the present disclosure, a UE select a particular MA signature from the pool of signatures based on a cell radio network temporary identifier (C-RNTI) of the UE.

In aspects of the present disclosure, a UE select a particular MA signature from the pool of signatures based on a Resume-ID assigned to the UE by the BS.

According to aspects of the present disclosure, a UE may generate a MA signature based on an ID of the UE, such as a globally unique ID (GUID), UEID, C-RNTI, or Resume-ID.

By having each UE select a MA signature (whether randomly or based on an ID of the UE) the possibility of contention among UEs may be further reduced, as well as reducing the signaling load of SI.

Because SI is broadcast at a certain periodicity (e.g., every 80 msec), there may be times when a UE has moved into a new cell, has a small data transfer to perform, but has not yet obtained the SI and the A-NOMA parameters and parameter ranges.

According to aspects of the present disclosure, a UE may obtain SI once the UE moves into a new cell, so that the UE can obtain A-NOMA CGs and be ready to use A-NOMA signaling when needed. Otherwise (if a UE does not obtain SI once the UE moves into a new cell) a UE may have data to send but have not had a chance to obtain parameters of the A-NOMA CGs from SI.

In aspects of the present disclosure, when a UE has data to send but has not had a chance to obtain parameters of the A-NOMA CGs of a cell, the UE can either fallback to the regular RACH based procedure (described previously), or wait for the next transmission occasion of the SI. The UE may determine which approach to use based on which approach has a shorter estimated latency.

Figure 8:
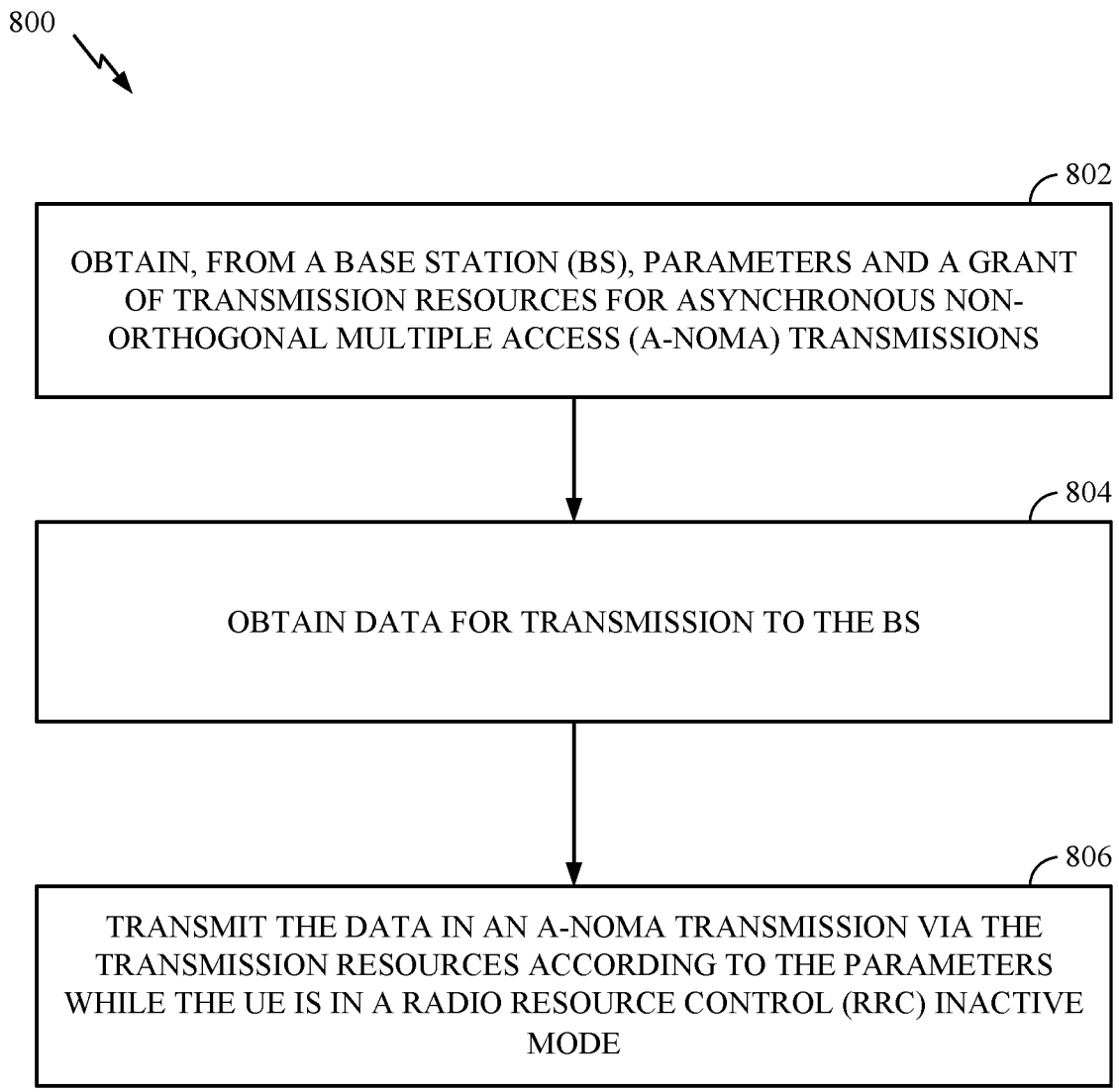
FIG. 8 is a flow diagram illustrating example operations that may be performed by a UE, in accordance with certain aspects of the present disclosure.

FIG. 8 is a flow diagram illustrating example operations 800 that may be performed, for example, by a user equipment (e.g., UE 120a of FIGS. 1 and 4), for wireless communications, in accordance with certain aspects of the present disclosure. Operations 800 may be implemented as software components that are executed and run on one or more processors (e.g., processor 480 of FIG. 4). Further, the transmission and reception of signals by the UE in operations 800 may be enabled, for example, by one or more antennas (e.g., antennas 452 of FIG. 4).

Operations 800 may begin, at block 802, by the UE obtaining, from a base station (BS), parameters and a grant of transmission resources for asynchronous non-orthogonal multiple access (A-NOMA) transmissions. For example, UE 120a (see FIG. 1) obtains parameters and a grant of transmission resources for asynchronous non-orthogonal multiple access (A-NOMA) transmissions in the cell 102a (see FIG. 1) from the BS 110a (see FIG. 1) serving the cell.

At block 804, operations 800 continue with the UE obtaining data for transmission to the BS. Continuing the example from above, the UE 120a obtains data (e.g., from an application running on the UE or from a communication the UE receives) for transmission to the BS 110a.

Operations 800 continue at block 806 with the UE transmitting the data in an A-NOMA transmission via the transmission resources according to the parameters while the UE is in a radio resource control (RRC) Inactive mode. Continuing the example from above, the UE 120a transmits the data (obtained in block 804) in an A-NOMA transmission via the transmission resources (from the grant in block 802) according to the parameters (obtained in block 802) while the UE is in an RRC Inactive mode (i.e., without performing a RACH procedure or otherwise entering RRC Connected mode).

Figure 9:
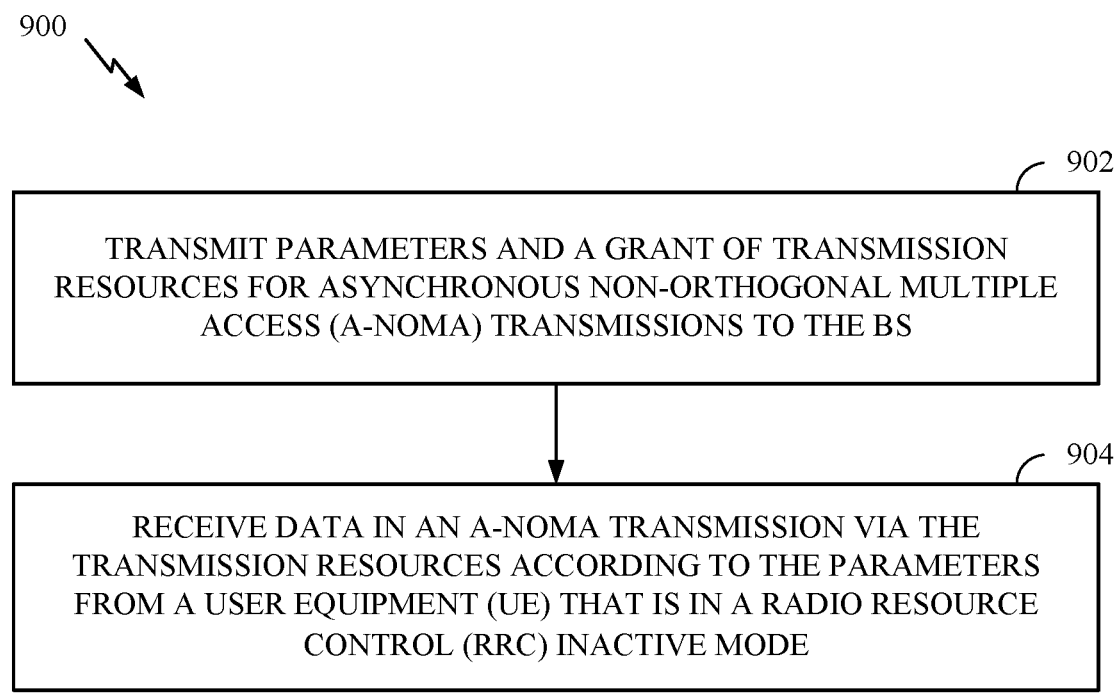
FIG. 9 is a flow diagram illustrating example operations that may be performed by a BS, in accordance with certain aspects of the present disclosure.

FIG. 9 is a flow diagram illustrating example operations 900 that may be performed, for example, by a base station (e.g., BS 110a of FIGS. 1 and 4), for wireless communications, in accordance with certain aspects of the present disclosure. Operations 900 may be implemented as software components that are executed and run on one or more processors (e.g., processor 440 of FIG. 4). Further, the transmission and reception of signals by the BS in operations 900 may be enabled, for example, by one or more antennas (e.g., antennas 434 of FIG. 4). Operations 900 may be considered complementary of operations 800, described with reference to FIG. 8 above.

Operations 900 may begin, at block 902, by the BS transmitting parameters and a grant of transmission resources for asynchronous non-orthogonal multiple access (A-NOMA) transmissions to the BS. For example, BS 110a (see FIG. 1) transmits parameters and a grant of transmission resources for asynchronous non-orthogonal multiple access (A-NOMA) transmissions to the BS.

At block 904, operations 900 continue with the BS receiving data in an A-NOMA transmission via the transmission resources according to the parameters from a user equipment (UE) that is in a radio resource control (RRC) Inactive mode. Continuing the example from above, the BS 110a receives data (e.g., from an application running on UE 120a) in an A-NOMA transmission via the transmission resources (from the grant in block 902) according to the parameters (transmitted in block 902) from UE 120a (see FIG. 1) that is in an RRC Inactive mode (i.e., UE 120a did not perform a RACH procedure or otherwise enter RRC Connected mode).

According to aspects of the present disclosure, for the initial transmission of a small data transfer (e.g., an A-NOMA transmission) by a UE, the UE may scramble the transmission using the C-RNTI of the UE (i.e., similar to a transmission by a UE in RRC Connected mode), to help the network identify the UE.

In aspects of the present disclosure, a UE may indicate that the initial transmission of a small data transfer (e.g., an A-NOMA transmission) is part of a SDT, or include a BSR MAC CE for the network to use in deciding whether to keep the UE in RRC Inactive mode or to cause the UE to transition into RRC Connected mode.

According to aspects of the present disclosure, after a successful reception of a transmission over resources configured in an A-NOMA CG, the network (e.g., a BS) may send back an ACK, if explicit acknowledgement of A-NOMA transmissions is enabled (e.g., enabled on the BS or enabled in the network).

In aspects of the present disclosure, the network (e.g., a BS) may, for subsequent transmissions of an SDT and in response to an initial transmission of an SDT, order the transmitting UE to enter RRC Connected mode to complete the SDT. In such a case, the network provides the transmitting UE with a timing alignment command and then dynamic UL grants of transmission resources for the UE to use to perform an RRC resume procedure.

According to aspects of the present disclosure, the network (e.g., a BS) may, for subsequent transmissions of an SDT, order the UE to stay in RRC Inactive mode but give the UE one or more dynamic UL grants to use in completing the SDT. In such a case, the network provides the UE with a timing alignment command and then dynamic UL grants of transmission resources for the UE to use to finish the rest of the SDT.

In aspects of the present disclosure, the network (e.g., a BS) may, for subsequent transmissions of an SDT, not provide any dynamic UL grants to the UE. In such a case, the UE remains in RRC Inactive mode and continues using A-NOMA CGs for transmission resources for transmitting the rest of the SDT.

According to aspects of the present disclosure, after a UE transmits an initial transmission (e.g., an A-NOMA transmission) of an SDT, the UE may start a CG timer and a retransmission (reTx) timer and then monitor a common search space for a reply from the network (e.g., a BS). If the UE does not receive a reply from the network before the reTx timer expires, then the UE may continue using A-NOMA CGs of transmission resources for A-NOMA transmissions to finish the rest of the SDT.

In aspects of the present disclosure, after a UE transmits an initial transmission (e.g., an A-NOMA transmission) of an SDT, if the UE receives a reply from the network (e.g., a BS) before the reTx timer expires, then the UE follows the order from the network (in the reply) to either transition to RRC Connected mode or finish the rest of the SDT over dynamic grants.

Figure 10:
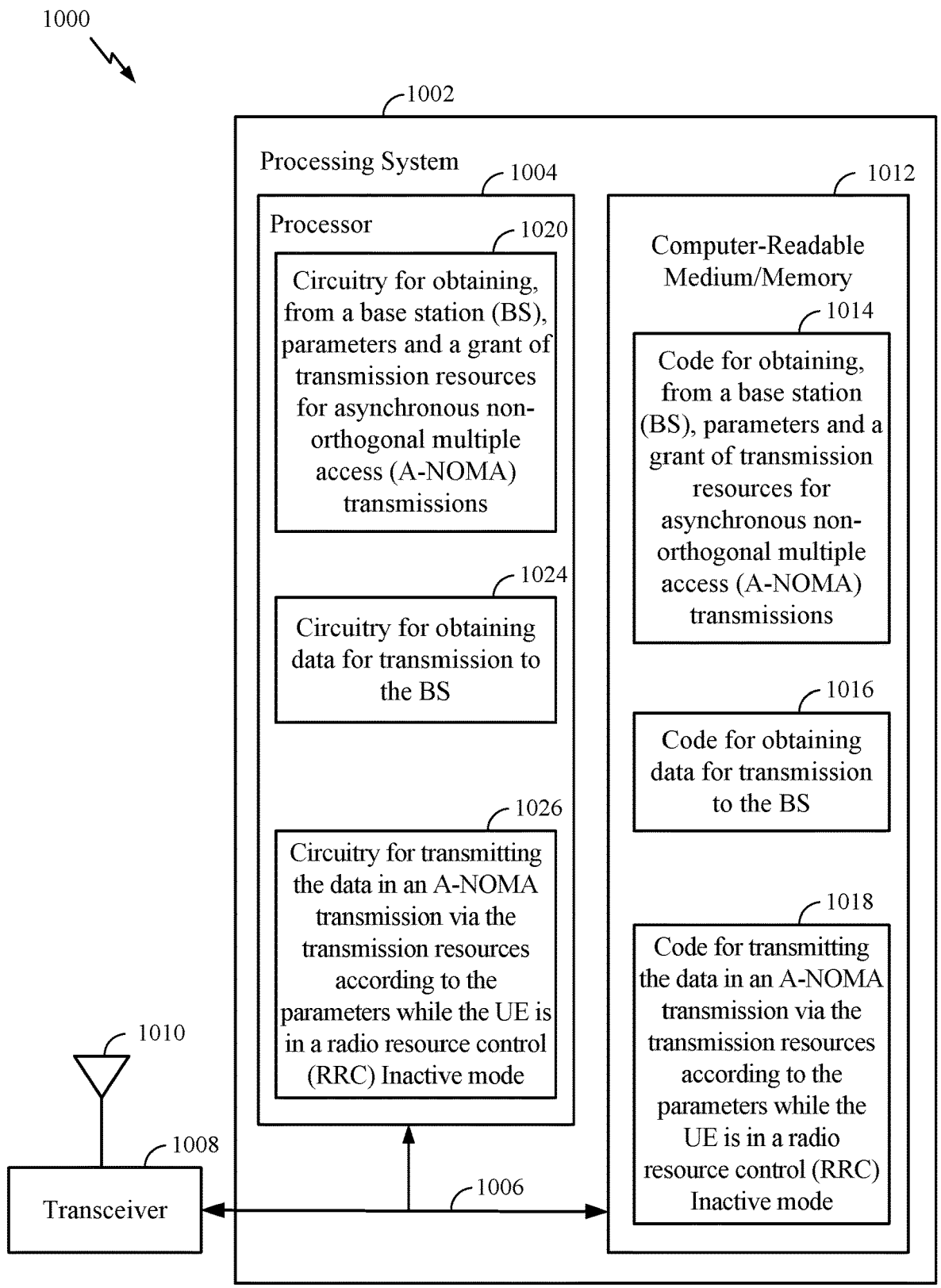
FIG. 10 illustrates a communications device that may include various components configured to perform the operations illustrated in FIG. 8, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 may be included in a UE, such as UE 120 (see FIG. 1). The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for A-NOMA transmissions. In certain aspects, computer-readable medium/memory 1012 stores code 1014 for obtaining, from a base station (BS), parameters and a grant of transmission resources for asynchronous non-orthogonal multiple access (A-NOMA) transmissions; code 1016 for obtaining data for transmission to the BS; and code 1018 for transmitting the data in an A-NOMA transmission via the transmission resources according to the parameters while the UE is in a radio resource control (RRC) Inactive mode. In certain aspects, the processor 1004 has circuitry configured to implement the code stored in the computer-readable medium/memory 1012. The processor 1004 includes circuitry 1020 for obtaining, from a base station (BS), parameters and a grant of transmission resources for asynchronous non-orthogonal multiple access (A-NOMA) transmissions; circuitry 1024 for obtaining data for transmission to the BS; and circuitry 1026 for transmitting the data in an A-NOMA transmission via the transmission resources according to the parameters while the UE is in a radio resource control (RRC) Inactive mode.

Figure 11:
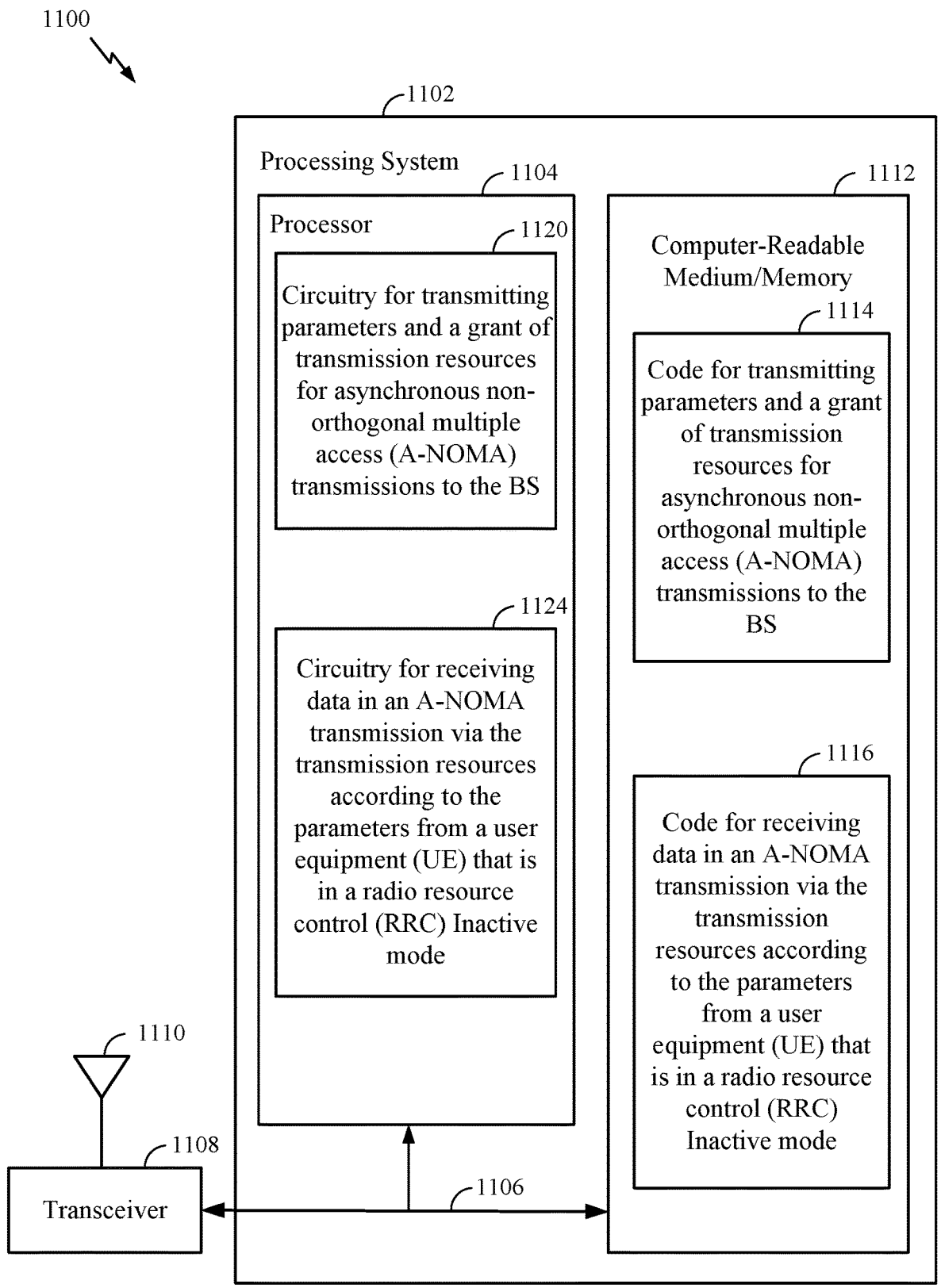
FIG. 11 illustrates a communications device that may include various components configured to perform the operations illustrated in FIG. 9, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1000 may be included in a BS, such as BS 110 (see FIG. 1). The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for A-NOMA transmissions. In certain aspects, computer-readable medium/memory 1112 stores code 1114 for transmitting parameters and a grant of transmission resources for asynchronous non-orthogonal multiple access (A-NOMA) transmissions to the BS; and code 1116 for receiving data in an A-NOMA transmission via the transmission resources according to the parameters from a user equipment (UE) that is in a radio resource control (RRC) Inactive mode. In certain aspects, the processor 1104 has circuitry configured to implement the code stored in the computer-readable medium/memory 1112. The processor 1104 includes circuitry 1120 for transmitting parameters and a grant of transmission resources for asynchronous non-orthogonal multiple access (A-NOMA) transmissions to the BS; and circuitry 1124 for receiving data in an A-NOMA transmission via the transmission resources according to the parameters from a user equipment (UE) that is in a radio resource control (RRC) Inactive mode.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for outputting, means for receiving, means for selecting, means for identifying, means for determining, means for performing, means for obtaining, and/or means for generating may comprise one or more processors or antennas at the BS 110 or UE 120, such as the transmit processor 420, controller/processor 440, receive processor 438, or antennas 434 at the BS 110 and/or the transmit processor 464, controller/processor 480, receive processor 458, or antennas 452 at the UE 120 of FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
obtaining, from a base station (BS), parameters and a grant of transmission resources for asynchronous non-orthogonal multiple access (A-NOMA) transmissions based on a multiple access (MA) signature of the UE;
obtaining data for transmission to the BS; and
transmitting the data in an A-NOMA transmission via the transmission resources according to the parameters while the UE is in a radio resource control (RRC) Inactive mode, wherein transmitting the data in the A-NOMA comprises indicating in the A-NOMA transmission that the data is a first part of a small data transfer (SDT).

2. The method of claim 1, wherein obtaining the grant and the parameters comprises:
receiving the grant and the parameters in a release configuration (Release-Config) message that orders the UE to enter the RRC Inactive mode.

3. The method of claim 1, wherein obtaining the grant and the parameters comprises:
receiving a range for a first parameter of the parameters in a system information (SI) broadcast from the BS; and
determining the first parameter from the range based on the MA signature of the UE.

4. The method of claim 3, further comprising:
selecting the MA signature from a pool of MA signatures in the SI broadcast.

5. The method of claim 4, wherein selecting the MA signature comprises selecting the MA signature from the pool based on at least one of a globally unique identifier (GUID) of the UE, a cell radio network temporary identifier (C-RNTI) of the UE, or a Resume-ID assigned to the UE by the BS.

6. The method of claim 3, further comprising:
generating the MA signature based on an identifier (ID) of the UE, wherein the ID comprises at least one of a globally unique identifier (GUID) of the UE, a cell radio network temporary identifier (C-RNTI) of the UE, or a Resume-ID assigned to the UE by the BS.

7. The method of claim 1, further comprising:
determining, based on an estimated latency for transmitting the data, to not perform a random access channel (RACH) procedure.

8. The method of claim 1, wherein transmitting the data via the A-NOMA transmission comprises scrambling the transmission based on a cell radio network temporary identifier (C-RNTI) of the UE.

9. The method of claim 1, further comprising:
receiving, from the BS and in response to the A-NOMA transmission, an order to enter an RRC connected mode;
entering the RRC connected mode; and
transmitting a second part of the SDT to the BS after entering the RRC connected mode.

10. The method of claim 1, further comprising:
receiving, in response to the A-NOMA transmission, a dynamic uplink (UL) grant from the BS; and
transmitting a second part of the SDT via transmission resources of the dynamic UL grant while the UE is in the RRC Inactive mode.

11. The method of claim 1, further comprising:
determining, based on the UE not receiving a response from the BS, to transmit a second part of the SDT via another A-NOMA transmission.

12. A method for wireless communications performed by a base station (BS), comprising:
transmitting, to a user equipment (UE), parameters and a grant of transmission resources for asynchronous non-orthogonal multiple access (A-NOMA) transmissions based on a multiple access (MA) signature of the UE; and
receiving data in an A-NOMA transmission via the transmission resources according to the parameters from the UE that is in a radio resource control (RRC) Inactive mode, wherein receiving data in an A-NOMA transmission comprises receiving an indication in the A-NOMA transmission that the data is a first part of a small data transfer (SDT).

13. The method of claim 12, wherein transmitting the grant and the parameters comprises:
transmitting the grant and the parameters in a release configuration (Release-Config) message that orders the UE to enter the RRC Inactive mode.

14. The method of claim 12, wherein:
transmitting the grant and the parameters comprises:
transmitting a range for a first parameter of the parameters in a system information (SI) broadcast; and
receiving the data comprises:
determining the first parameter from the range based on the MA signature of the UE.

15. The method of claim 14, further comprising:
transmitting a pool of MA signatures in the SI broadcast.

16. The method of claim 14, further comprising:
determining the MA signature based on an identifier (ID) of the UE, wherein the ID comprises at least one of a globally unique identifier (GUID) of the UE, a cell radio network temporary identifier (C-RNTI) of the UE, or a Resume-ID assigned to the UE by the BS.

17. The method of claim 12, wherein receiving the data via the A-NOMA transmission comprises determining the UE based on descrambling the A-NOMA transmission based on a cell radio network temporary identifier (C-RNTI) of the UE.

18. The method of claim 12, further comprising:
determining, based on the indication in the A-NOMA transmission, that the data is the first part of the SDT;
transmitting, to the UE and in response to the A-NOMA transmission, an order to enter an RRC connected mode; and
receiving a second part of the SDT from the UE in the RRC connected mode.

19. The method of claim 12, further comprising:
determining, based on the indication in the A-NOMA transmission, that the data is the first part of the SDT;
transmitting, in response to the A-NOMA transmission, a dynamic uplink (UL) grant to the UE; and
receiving a second part of the SDT via transmission resources of the dynamic UL grant from the UE in the RRC Inactive mode.

20. The method of claim 12, further comprising:
determining, based on the indication in the A-NOMA transmission, that the data is the first part of the SDT; and
receiving a second part of the SDT via another A-NOMA transmission.

21. An apparatus for wireless communications, comprising:
a processor configured to:
obtain, from a base station (BS), parameters and a grant of transmission resources for asynchronous non-orthogonal multiple access (A-NOMA) transmissions based on a multiple access (MA) signature of the apparatus;
obtain data for transmission to the BS; and
transmit the data in an A-NOMA transmission via the transmission resources according to the parameters while the apparatus is in a radio resource control (RRC) Inactive mode, wherein, in order to transmit the data in the A-NOMA transmission, the processor is further configured to indicate in the A-NOMA transmission that the data is a first part of a small data transfer (SDT); and
a memory coupled with the processor.

22. The apparatus of claim 21, wherein the processor is configured to obtain the grant and the parameters by receiving the grant and the parameters in a release configuration (Release-Config) message that orders the apparatus to enter the RRC Inactive mode.

23. The apparatus of claim 21, wherein the processor is configured to obtain the grant and the parameters by:
receiving a range for a first parameter of the parameters in a system information (SI) broadcast from the BS; and
determining the first parameter from the range based on the MA signature of the apparatus.

24. The apparatus of claim 23, wherein the processor is further configured to:
select the MA signature from a pool of MA signatures in the SI broadcast.

25. The apparatus of claim 21, wherein the processor is further configured to:
determine, based on an estimated latency for transmitting the data, to not perform a random access channel (RACH) procedure.

26. The apparatus of claim 21, wherein the processor is configured to transmit the data via the A-NOMA transmission by scrambling the transmission based on a cell radio network temporary identifier (C-RNTI) of the apparatus.

27. The apparatus of claim 21, wherein the processor is further configured to:
receive, from the BS and in response to the A-NOMA transmission, an order to enter an RRC connected mode;
enter the RRC connected mode; and
transmit a second part of the SDT to the BS after entering the RRC connected mode.

28. The apparatus of claim 21, wherein the processor is further configured to:
receive, in response to the A-NOMA transmission, a dynamic uplink (UL) grant from the BS; and
transmit a second part of the SDT via transmission resources of the dynamic UL grant while the apparatus is in the RRC Inactive mode.

29. The apparatus of claim 21, wherein the processor is further configured to:
determine, based on the apparatus not receiving a response from the BS, to transmit a second part of the SDT via another A-NOMA transmission.

30. An apparatus for wireless communications, comprising:
a processor configured to:
transmit, to a user equipment (UE), parameters and a grant of transmission resources for asynchronous non-orthogonal multiple access (A-NOMA) transmissions based on a multiple access (MA) signature of the UE; and
receive data in an A-NOMA transmission via the transmission resources according to the parameters from the UE that is in a radio resource control (RRC) Inactive mode, wherein, in order to receive the data, the processor is further configured to receive an indication in the A-NOMA transmission that the data is a first part of a small data transfer (SDT); and
a memory coupled with the processor.

* * * * *